(12) United States Patent
Langemann

(10) Patent No.: US 8,857,648 B2
(45) Date of Patent: Oct. 14, 2014

(54) TANK CLOSURE ASSEMBLY

(75) Inventor: Martin Langemann, Duesselorf (DE)

(73) Assignee: MAGNA STEYR Fuel Systems GesmbH, Sinabelkirchen (AT)

( * ) Notice: Subject to any disclaimer, the term of this patent is extended or adjusted under 35 U.S.C. 154(b) by 168 days.

(21) Appl. No.: 13/432,196

(22) Filed: Mar. 28, 2012

(65) Prior Publication Data

US 2012/0248114 A1 Oct. 4, 2012

(30) Foreign Application Priority Data

Mar. 29, 2011 (DE) ...................... 20 2011 004 562 U

(51) Int. Cl.
*B65D 53/00* (2006.01)
*F01N 3/24* (2006.01)
*B60K 15/04* (2006.01)

(52) U.S. Cl.
CPC ............ *F01N 3/24* (2013.01); *B60K 2015/0451* (2013.01); *F01N 2610/1413* (2013.01); *Y10S 220/33* (2013.01)
USPC ...................... 220/304; 220/371; 220/DIG. 33

(58) Field of Classification Search
USPC ................... 220/371, 372, 304, DIG. 33, 326; 215/220, 277, 261
See application file for complete search history.

(56) References Cited

U.S. PATENT DOCUMENTS

| 2,058,214 | A | | 10/1936 | Cohn |
| 4,696,409 | A | * | 9/1987 | Vize ........................... 220/203.2 |
| 6,197,858 | B1 | | 3/2001 | Hagano et al. |
| 2009/0145903 | A1 | | 6/2009 | Soltis et al. |
| 2009/0294450 | A1 | | 12/2009 | Schmalz et al. |

FOREIGN PATENT DOCUMENTS

| DE | 102007043991 A1 | 4/2009 |
| EP | 2106950 A2 | 10/2009 |
| WO | 9731835 A1 | 9/1997 |

* cited by examiner

*Primary Examiner* — Fenn Mathew
*Assistant Examiner* — James N Smalley
(74) *Attorney, Agent, or Firm* — Jordan IP Law, LLC; Todd A. Vaughn

(57) ABSTRACT

A tank closure assembly for closing the filler neck of a vehicle tank, the tank closure assembly having a closing body of cap-like design which can be screwed onto the filler neck and which has a receptacle for a sealing element in order to seal off an annular gap between the filler neck and the closing body. An insert element is introduced into the closing body through an open underside thereof and is attached in the closing body, the insert element carrying one or more internal threads via which the closing body can be fixed to the filler neck. The receptacle is formed between the insert element and the top side of the closing body.

17 Claims, 5 Drawing Sheets

TANK CLOSURE ASSEMBLY

CROSS-REFERENCE TO RELATED APPLICATIONS

The present application claims priority under 35 U.S.C. §119 to German Patent Application No. 20 2011 004 562 U1 (filed on Mar. 29, 2011), which is hereby incorporated by reference in its entirety.

FIELD OF THE INVENTION

The invention relates to a tank closure assembly for closing the filler neck of a vehicle tank, in particular, of a vehicle accessory tank for receiving an aqueous urea solution for the retreatment of exhaust gases. The tank closure includes a closing body of cap-like design structurally configured for attachment, for example, by thread attachment, onto the filler neck and which has a receptacle for a sealing element in order to seal off an annular gap between the filler neck and the closing body.

BACKGROUND OF THE INVENTION

In order to lower the nitrogen oxide emissions in diesel vehicles, retreatment of the exhaust gases by what is known as selective catalytic reduction (SCR) increasingly takes place. With the aid of this technology, commercial vehicles can satisfy the Euro-V standard and passenger cars can comply with the very stringent American exhaust gas standards. In selective catalytic reduction, a chemical reaction takes place at the SCR catalytic converter. This reaction is selective, that is to say nitrogen oxides (NO, $NO_2$) are preferentially reduced, while undesirable secondary reactions, such as, for example, the oxidation of sulphur dioxide into sulphur trioxide, are largely suppressed.

For the reduction of nitrogen oxides, ammonia ($NH_3$) is required which is admixed to the exhaust gas. The products of the reaction are water ($H_2O$) and nitrogen ($N_2$). The ammonia required for the SCR reaction is not used directly, that is to say in pure form, in vehicles, but in the form of a 32.5% aqueous urea solution which is designated uniformly by industry as AdBlue. The composition is stipulated in DIN 70070. This aqueous solution is injected, upstream of the SCR catalytic converter, into the exhaust tract where ammonia and $CO_2$ arise from the urea solution as a result of a hydrolysis reaction. The ammonia thus generated can react with the nitrogen oxides in the exhaust gas in the SCR catalytic converter at an appropriate temperature.

The consumption of urea/water solution amounts to about 2 to 8% of the diesel fuel used, depending on the untreated emission of the engine. A corresponding accessory tank having a corresponding volume is therefore provided for the urea solution in vehicles. The filler neck of this accessory tank is closed by means of a tank closure assembly. This includes a closing body of cap-like design which is screwed onto the filler neck. In the closing body, a receptacle is provided for a sealing element which serves for sealing off an annular gap between the filler neck and the closing body when the closing body is screwed onto the filler neck.

In the tank closure assemblies known hitherto, the closing body is produced with the internal thread and with the receptacle for the sealing element as an injection moulding. However, this is difficult to manufacture, since the inner contour has, particularly in the region of the receptacle for the sealing element, undercuts, the production of which requires split moulds. This leads on the finished product to mould separation edges and production inaccuracies which may cause leaks during use.

SUMMARY OF THE INVENTION

An object of the invention is, therefore, to provide a tank closure assembly for closing the filler neck of a vehicle tank, in particular, of a vehicle accessory tank for receiving an aqueous urea solution for the retreatment of exhaust gases. The tank closure includes a closing body of cap-like design structurally configured for attachment, for example, by thread attachment, onto the filler neck and which has a receptacle for a sealing element in order to seal off an annular gap between the filler neck and the closing body.

Another object of the invention is to provide such a tank closure assembly which is simple to produce and ensures high component accuracy and consequently high leak-tightness during use.

At least these objects are achieved, in accordance with the invention, in that an insert element is introduced into the closing body through the open underside of the closing body and is fixed therein. The insert element has an internal thread via which the closing body can be fixed to the filler neck. The receptacle for the sealing element is formed between the insert element and the top side of the closing body.

At least these objects are additionally achieved by a tank closure assembly for a filler neck of a vehicle tank, the tank closure assembly including at least one of: a closing body configured for connection to the filler neck, the closing body having a receptacle; a sealing element provided in the receptacle to provide a seal at an annular gap between the filler neck and the closing body; and an insert element configured for receipt into the closing body, the insert element having internal threads via which the closing body is attached to the filler neck, the receptacle being formed between the insert element and a top side of the closing body.

At least these objects are additionally achieved by a tank closure assembly for a filler neck of a vehicle tank, the tank closure assembly including at least one of: a closing body configured for connection to the filler neck, the closing body having a receptacle and an orifice at a top side thereof; a sealing element provided in the receptacle which provides a seal at an annular gap between the filler neck and the closing body; an insert element received into the closing body at a bottom side thereof and is fixed in the closing body, the insert element having internal threads via which the closing body is connected to the filler neck; a diaphragm which closes the orifice from the inside of the closing body; and a supporting ring which supports the diaphragm, the supporting ring being provided in the receptacle between the sealing element and the diaphragm.

At least these objects are additionally achieved by a tank closure assembly for a filler neck of a vehicle tank, the tank closure assembly including at least one of: a closing body having on a top side thereof an orifice configured to ventilate and bleed the tank; a diaphragm provided in the closing body to close the orifice from an inside of the closing body, the diaphragm being air-permeable and liquid-impermeable; and an insert element configured for receipt into the closing body at a bottom side thereof and by which the closing body is connected to the filler neck, the insert element having a plurality of latching recesses at a lower region thereof, a plurality of latching noses each configured for receipt into a corresponding one of the latching recesses, a plurality of sloping faces formed on surface thereof spatially above the latching recesses, each configured for engagement by a corresponding one of the latching noses when the insert element is received into the closing body.

The invention is thus based on the idea of a tank closure assembly being of multi-part design. In concrete terms, an insert element is provided, on which the internal thread for connection to the filler neck is formed. This insert element is introduced into the closing body through the open underside of the closing body and is fixed in the closing body, for example, by snap-fit. By virtue of this configuration, the closing body itself may be designed as a simple cap which has an essentially smooth contour on the inside. It is necessary, at most, to provide on the inner contour latching recesses or latching noses which come into engagement resiliently with corresponding counter elements of the insert element.

The insert element is introduced into the closing body to an extent such that a receptacle for the sealing element is defined between the top side of the insert element and the top side of the closing body. As a result, the sealing element needs merely to be introduced into the closing body before the insert element is introduced. The introduction of the sealing element is consequently simple to carry out.

As a result of the multi-part construction, there is no need for multi-part moulds during production by injection moulding, and therefore, also, no mould edges occur on the finished component. Production accuracy and therefore reliability in use are consequently high.

In accordance with one embodiment of the invention, the sealing element is designed annularly and, in particular, as a lip seal. When a lip seal is used, this has a plurality of lips which project upwards in the direction of the top side of the closing body and which come to bear against the inner wall of the closing body, on the one hand, and against the filler neck, on the other hand, and thus, ensure optimal sealing-off.

The closing body may be closed on its top side. In accordance with a preferred embodiment, however, the closing body has on its top side an orifice which is closed from the inside of the closing body by way of an air-permeable, but liquid-impermeable diaphragm. This diaphragm can be firmly welded to the closing body if the diaphragm is composed of plastic. Pressure equalization between the tank interior and the surroundings is possible by virtue of the orifice.

Expediently, in such an embodiment a supporting ring, which supports the diaphragm, is provided in the receptacle of the closing body between the sealing element and the diaphragm.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

Figure 1:
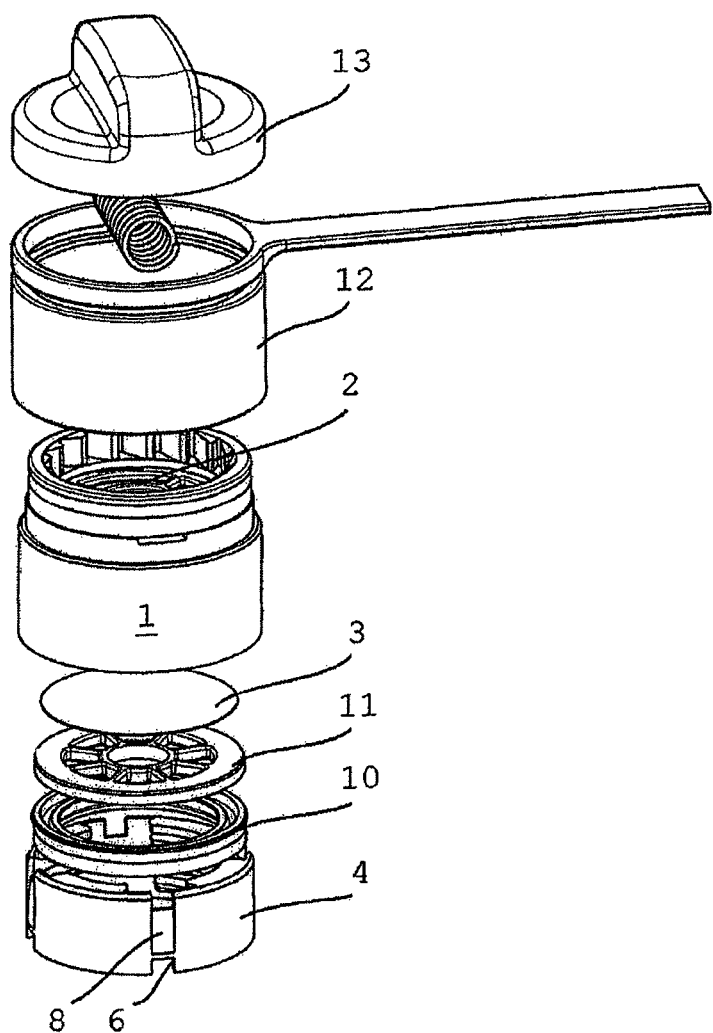
FIG. 1 illustrates, in a perspective exploded view, a tank closure assembly in accordance with the invention.

FIG. 1 illustrates a tank closure assembly in accordance with the present invention. This serves for closing the filler neck of a vehicle accessory tank in which an aqueous urea solution for the retreatment of exhaust gases is carried. The tank closure assembly includes a closing body 1 of cap-like design. The closing body 1 has a cylindrical basic shape and can be closed on its top side. In the embodiment illustrated here, however, the closing body 1 has on its top side an orifice 2 which serves for ventilating and bleeding the tank. The orifice 2 is closed from the inside of the closing body 1 by way of an air-permeable, but liquid-impermeable diaphragm 3. The diaphragm 3 is inserted into the closing body 1 through an open underside thereof and is attached, for example, via weld process, to the plastic material of the closing body 1.

Figure 2:
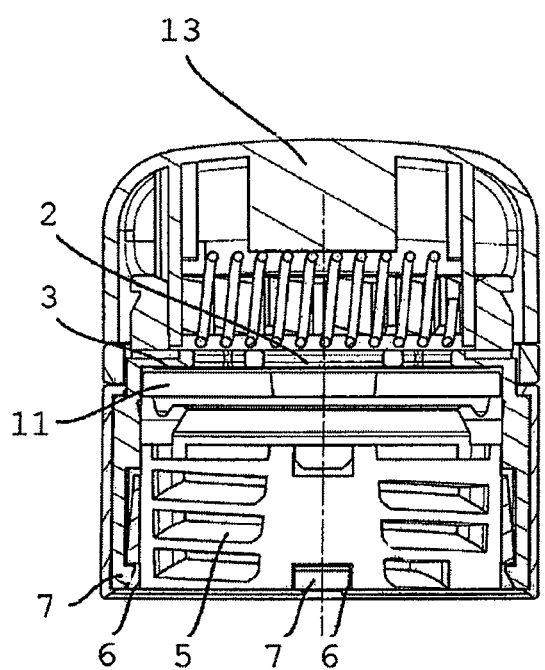
FIG. 2 illustrates a sectional view of the tank closure assembly of FIG. 1 in an assembled state.

The tank closure assembly also includes an insert element 4 which is introduced into the closing body 1 through the open underside thereof and which is attached for placement in the closing body 1. As illustrated in FIG. 2, the insert element 4 carries one or more internal threads 5, via which the closing body 1 can be screwed onto the filler neck of the vehicle accessory tank.

As illustrated particularly from FIG. 3 to FIG. 6, the insert element 4 is snapped tight in the closing body 1. For this purpose, altogether four latching recesses 6 are provided, in each case offset at 90° to one another, on the lower marginal region of the insert element 4, into which latching recesses corresponding latching noses 7 provided on the inner wall of the closing body 1 can be received and latched.

Figure 3:
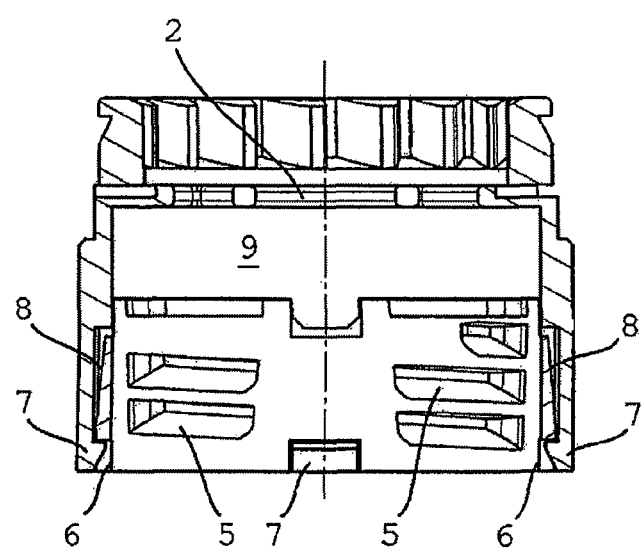
FIG. 3 illustrates a longitudinal section through the closing body of the tank closure assembly with the insert element mounted thereon.
Figure 4:
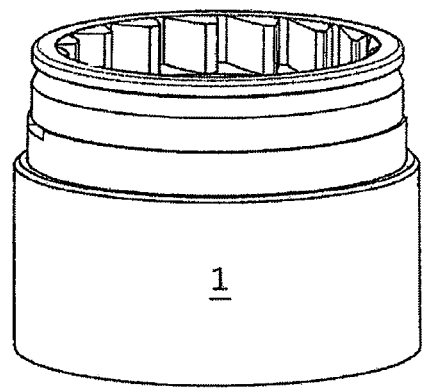
FIG. 4 illustrates a perspective illustration of the closing body of the tank closure assembly.
Figure 6:
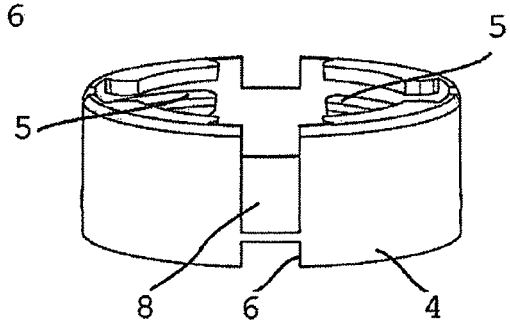
FIG. 6 illustrates, in a perspective illustration, the insert element of the tank closure assembly.
Figure 5:
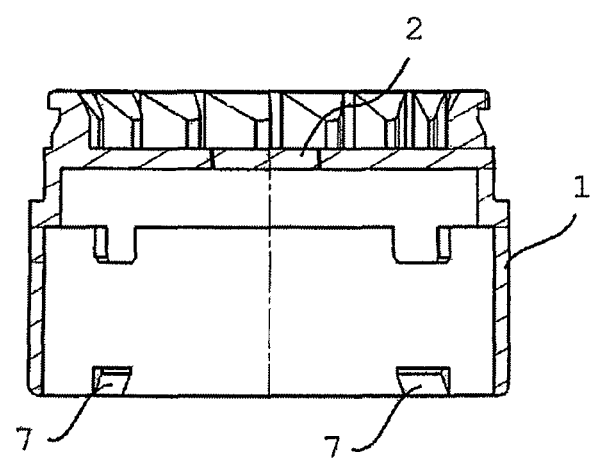
FIG. 5 illustrates the closing body of FIG. 4 in longitudinal section.

As illustrated in FIG. 3, sloping faces 8 are formed on the wall of the insert element 4 above the latching recesses 6, the latching noses 7 of the closing body 1 coming into engagement with the sloping faces 8 and being pressed elastically outwards by them when the insert element 4 is pushed into the closing body 1. A receptacle 9 is formed in the closing body 1 above the insert element 4 when the insert element 4 is fixed in the closing body 1. This receptacle 9 accommodates a lip seal 10 and a supporting ring 11 which is provided with through orifices 11a and which comes to bear against the underside of and supports the diaphragm 3.

The tank closure assembly further includes a masking sleeve 12, which receives the closing body 1, and a tank cover 13 which closes the open top side of the tank closure assembly 1.

During assembly, first, the diaphragm 3 is inserted into the closing body 1 and is firmly welded on the inside to the closing body 1 in order to close the orifice 2. The supporting ring 11 and the lip seal 10 are subsequently introduced into the closing body 1 before the insert element 4 is inserted into the closing body 1 and snapped tight therein. The unit thus assembled can be screwed onto the filler neck before the masking sleeve 12 and the tank cover 13 are fitted.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A tank closure assembly for a filler neck of a vehicle tank, the tank closure assembly comprising:
   a closing body configured for connection to the filler neck, the closing body having a receptacle and an open top side thereof with an orifice which serves to ventilate and bleed the vehicle tank;
   a diaphragm which closes the orifice from an inside of the closing body;
   a sealing element provided in the receptacle to provide a seal at an annular gap between the filler neck and the closing body;
   a supporting ring which supports the diaphragm, the supporting ring being provided in the receptacle of the closing body between the sealing element and the diaphragm; and
   an insert element configured for receipt into the closing body, the insert element having internal threads via which the closing body is attached to the filler neck, the receptacle being formed between the insert element and a top side of the closing body.

2. The tank closure assembly of claim 1, wherein the insert element is connected by snap-fit into the closing body.

3. The tank closure assembly of claim 1, wherein the sealing element comprises a lip seal.

4. The tank closure assembly of claim 1, wherein the diaphragm is air-permeable and liquid-impermeable.

5. The tank closure assembly of claim 4, wherein the diaphragm is composed of plastic.

6. The tank closure assembly of claim 5, wherein the diaphragm is attached to the closing body via a weld process.

7. A tank closure assembly for a filler neck of a vehicle tank, the tank closure assembly comprising:
   a closing body configured for connection to the filler neck, the closing body having a receptacle and an orifice at an open top side thereof;
   a sealing element provided in the receptacle which provides a seal at an annular gap between the filler neck and the closing body;
   an insert element received into the closing body at a bottom side thereof and is fixed in the closing body, the insert element having internal threads via which the closing body is connected to the filler neck, a plurality of latching recesses at a lower region thereof, a plurality of latching noses each configured for receipt into a corresponding one of the latching recesses, and a plurality of sloping faces formed on surface thereof spatially above the latching recesses, each configured for engagement by a corresponding one of the latching noses when the insert element is received into the closing body;
   a diaphragm which closes the orifice from the inside of the closing body; and
   a supporting ring which supports the diaphragm, the supporting ring being provided in the receptacle between the sealing element and the diaphragm.

8. The tank closure assembly of claim 7, wherein the diaphragm is air-permeable.

9. The tank closure assembly of claim 7, wherein the diaphragm is liquid-impermeable.

10. The tank closure assembly of claim 7, wherein the diaphragm is air-permeable and liquid-impermeable.

11. A tank closure assembly for a filler neck of a vehicle tank, the tank closure assembly comprising:
   a closing body having on a top side thereof an orifice configured to ventilate and bleed the tank;
   a diaphragm provided in the closing body to close the orifice from an inside of the closing body, the diaphragm being air-permeable and liquid-impermeable; and
   an insert element configured for receipt into the closing body at a bottom side thereof and by which the closing body is connected to the filler neck, the insert element having a plurality of latching recesses at a lower region thereof, a plurality of latching noses each configured for receipt into a corresponding one of the latching recesses, a plurality of sloping faces formed on surface thereof spatially above the latching recesses, each configured for engagement by a corresponding one of the latching noses when the insert element is received into the closing body.

12. The tank closure assembly of claim 11, wherein the latching recesses are offset at 90° to one another.

13. The tank closure assembly of claim 11, wherein the latching noses are provided on the inner wall of the closing body.

14. The tank closure assembly of claim 11, wherein a receptacle is formed in the closing body above the insert element when the insert element is received into the closing body.

15. The tank closure assembly of claim 14, further comprising:
   a seal provided in the receptacle which provides a seal at an annular gap between the filler neck and the closing body; and
   a supporting ring which engages an underside of and supports the diaphragm.

16. The tank closure assembly of claim 11, further comprising a masking sleeve which receives the closing body.

17. The tank closure assembly of claim 11, further comprising a tank cover which closes a top side of the tank closure assembly.

* * * * *